United States Patent [19]
Ahlberg et al.

[11] Patent Number: 5,574,774
[45] Date of Patent: Nov. 12, 1996

[54] METHOD AND APPARATUS OF MAINTAINING AN OPEN COMMUNICATIONS CHANNEL BETWEEN A CELLULAR TERMINAL AND AN ASSOCIATED CELLULAR RADIO NETWORK

[75] Inventors: Björn G. D. Ahlberg, Falsterbo, Sweden; Johan Falk; Anders Mölne, both of Cary, N.C.

[73] Assignee: Ericsson Inc., Research Triangle Park, N.C.

[21] Appl. No.: 237,678

[22] Filed: May 4, 1994

[51] Int. Cl.$^6$ .................................................. H04Q 7/22
[52] U.S. Cl. .............................. 379/59; 379/63; 455/33.1
[58] Field of Search ................................. 379/58, 59, 60, 379/63, 61; 455/33.1, 33.2, 54.1, 51.1, 34.2

[56] References Cited

U.S. PATENT DOCUMENTS

| | | | |
|---|---|---|---|
| 5,159,702 | 10/1992 | Aratake | 455/33.1 |
| 5,280,541 | 1/1994 | Marko et al. | 379/61 |

FOREIGN PATENT DOCUMENTS 58-134542  8/1983  Japan.

OTHER PUBLICATIONS

Peter Striebel, Mobile Communications International Conference COMEX 93, Hilton National Hotel, Wembley, London (G), Conference Proceedings, Track 3: Mobile Data Development, "MODACOM, Germany's Mobile Data Service", Oct. 18–19, 1993.

*Primary Examiner*—Curtis Kuntz
*Assistant Examiner*—Michael B. Chernoff
*Attorney, Agent, or Firm*—Bell, Seltzer, Park & Gibson

[57] ABSTRACT

A cellular radio communications system includes a cellular radio network for establishing communications, via a communications link such as a voice channel, with a cellular terminal and open communications link maintaining means for maintaining the communications link in an open state for a predetermined time period following termination of the communications with the cellular terminal. Accordingly, the user of the cellular terminal may continue to access the cellular radio network within the predetermined time period via the open communications link or voice channel. The cellular radio communications system may also include a feature node for providing predetermined functions to the cellular terminals associated with the cellular radio network. The open communications link maintaining means typically includes a timer and related controller for initiating and monitoring the predetermined time period. In addition, either the cellular terminals, themselves, or a feature node associated with the cellular radio network may include the communications link maintaining means.

47 Claims, 6 Drawing Sheets

METHOD AND APPARATUS OF MAINTAINING AN OPEN COMMUNICATIONS CHANNEL BETWEEN A CELLULAR TERMINAL AND AN ASSOCIATED CELLULAR RADIO NETWORK

FIELD OF THE INVENTION

The present invention relates generally to communications systems and, more specifically, to cellular radio communications systems.

BACKGROUND OF THE INVENTION

Cellular communications systems are commonly employed to provide voice and data communications to a plurality of mobile units or subscribers. Analog cellular systems, such as designated AMPS, TACS, ETACS, NMT-450, NMT-900, CP1, CP2 and Telepoint have been deployed successfully throughout the world. More recently, digital cellular systems, such as designated IS-54B in North America and the pan-European GSM system as well as ADC, JDC, DE and DCT cellular systems, have been introduced. These systems, and others, are described, for example, in the book titled Cellular Radio Systems by Balston, et al., published by Artech House, Norwood, Mass., 1993.

A cellular radio communications system generally includes one or more stations or units, typically referred to as cellular terminals, one or more base stations and a mobile telephone switching office. A typical cellular radio communications system may include hundreds of base stations, thousands of cellular terminals and more than one mobile telephone switching office. The mobile telephone switching office and the plurality of base stations associated therewith generally define the cellular radio network.

The cellular radio network is typically divided into cells which include one base station and the cellular terminals with which the base station is in communication. Each cell will have allocated to it one or more voice channels and, if the cellular radio network is digital, one or more dedicated control channels. For example, a typical cell of a digital cellular radio network has one control channel and 21 voice/data or traffic, channels. The control channel is a dedicated channel for transmitting cell identification and paging information while the voice channels carry the voice and the data information, such as, for example, via a Dual Tone Multi Frequency tone signalling scheme. Note that "channel" may refer to a specific carrier frequency in an analog system or to a specific carrier/slot combination in a hybrid TDMA/FDMA system, such as IS-45 or in GSM.

The mobile telephone switching office is a central coordinating element of the overall cellular radio network. The mobile telephone switching office typically includes a cellular processor and a cellular switch which provides the interface to an associated public switched telephone network. The mobile telephone switching office also generally includes a Home Location Register. The Home Location Register includes a memory device for storing data relating to the subscribers to the cellular system. This data may include the location of the subscriber as well as any specific services requested by the subscriber, such as call waiting or call hold.

Each base station of a cellular radio network generally includes a control unit and an antenna tower. The control unit comprises the base station electronics including the radio control group, the exchange radio interface, a primary power supply for converting electric power from the AC grid to power the individual components within the base station and a backup power supply.

The exchange radio interface of the control unit of the base station electronics provides signals between the mobile telephone switching office and the base station. For example, the exchange radio interface receives data from the radio channel group and transfers the data to the mobile telephone switching office via a dedicated communications link. In the reverse direction, the exchange radio interface receives data from the mobile telephone switching office into the radio channel group for subsequent transmission to a cellular terminal.

The radio control group includes the electronic equipment necessary to effect radio communications. A radio control group typically includes one transmit/receive module for each voice and control channel as well as one signal strength receiver. Each transmit/receive module includes a transmitter, receiver and control unit. The transmit/receive modules are not typically frequency agile and operate, instead, on only one predetermined channel. Control signals from the exchange radio interface are received by the individual control units of the transmit/receive modules. In addition, voice and data traffic signals from the transmit/receive modules are routed over separate interfaces to the exchange radio interface.

Thereafter, each individual transmitter for control and voice signals is connected to a transmit combiner. The transmit combiner combines all of the input signals onto a signal output coupled through a coaxial cable to the transmit antenna. On the receive side, each of two receive antennas is coupled to a respective receive combiner where the signals received are separated according to frequency and passed on to the individual receivers in each of the transmit/receive modules.

The base station handles the radio communication with the cellular terminals. In this capacity, the base station functions chiefly as a relay station for data and voice signals. The base station also supervises the quality of the communications link and monitors or receives signals from the cellular terminals. A typical base station is Model No. RBS882 manufactured by Ericsson Telecom AB Stockholm, Sweden for the CMS8800 Cellular Mobile Telephone System. A full description of this analog cellular network is provided in Publication No. EN/LZT 101 908 R2B, published by Ericsson Telecom AB.

Through the cellular radio network, a duplex radio communications signal or link may be established between two cellular terminals or, between a cellular terminal and a landline telephone terminal. In particular, a communications link is established by a cellular radio communication system, in part, via a voice channel which is established between a cellular terminal and the cellular radio network. The communications link may be completed by the interconnection of the open voice channel to a second voice channel between the cellular radio network and another cellular terminal serviced by the cellular radio network. Alternatively, the communications link may be completed by interconnection of the open voice channel with a voice channel established between the cellular radio network and the public switched telephone network and, in turn, with a terminal associated with the public switched telephone network, such as a landline telephone terminal.

A feature node may also be associated with the mobile telephone switching office of the cellular radio communications system or with another communications network, such as a public switched telephone network. For example, the feature node may be incorporated within or associated with the Home Location Register of the mobile telephone switching office. The feature node provides predetermined functions to the cellular terminals or to the terminals associated with the public switched telephone network, such as, for example, establishing an efficient communications link between terminals, such as via intermediate base stations, or providing voice-control speech information and number translation services as well as facilitating the establishment of conference telephone calls. Still further, a feature node may provide paging services for the user of a cellular terminal and may facilitate the establishment of alternative communications links if the primary communications link is unavailable. For example, a feature node is described in more detail in U.S. Patent application Ser. No. 018,268 entitled "A Method of Establishing Cooperation With a Functionality" and U.S. Patent application Ser. No. 018,223 entitled "A Method of Organizing Communication", both of which were filed on Feb. 16, 1993 and both of which are incorporated herein by reference.

Typically, the voice channels which establish the communications link between the cellular terminal and the cellular radio network are disconnected upon the termination of the communications. For example, the voice channel between a cellular terminal and a cellular radio network and, in particular, the voice channel between the cellular terminal and the respective base station is disconnected upon the termination of communications with the cellular terminal. More specifically, the user of the cellular terminal may terminate the session by hanging up or turning off the cellular terminal or the cellular radio network and, in turn, the cellular terminal may receive an "end communications" signal from the other terminal indicating that the communications has been discontinued. Thereafter, the disconnected voice channel may be reused by the same or another cellular terminal. As known by those skilled in the art, communications may also be terminated due to low or insufficient signal strength or by the use of the cellular terminal exiting the service area of the cellular radio network.

As explained, a cellular terminal is serviced by and communicates with the base station of the cell in which the cellular terminal is located. Each base station has, however, only a limited number of voice channels with which to communicate with the cellular terminals in its cell. Accordingly, the cellular terminals compete for the limited number of voice channels and, if demand for the voice channels exceeds the number of available channels, a cellular terminal will not be able to establish communications with the cellular radio network. Instead, the cellular terminal will be forced to wait until a channel subsequently becomes available. In addition, even if a voice channel is available, the establishment of the desired communications link consumes time and delays initiation of the communications.

SUMMARY OF THE INVENTION

In view of the foregoing background, it is therefore an object of the present invention to provide a cellular radio communication system and an associated method for improving the efficiency with which a user of a cellular terminal may access a cellular radio network.

It is also an object of the present invention to provide a cellular terminal for improving the efficiency with which a user of the cellular terminal may access a cellular radio network.

These and other objects, advantages and features of the present invention are provided by a cellular radio communications system which maintains a communications link open for a predetermined time period after termination of communications between a cellular terminal and the cellular radio communications system, via the communications link. Accordingly, the cellular terminal may continue to access the cellular radio network, via the open communications link, during the predetermined time period following termination of communications, notwithstanding termination of communications between the cellular terminal and the cellular radio communications system. Thus, the user of the cellular terminal may establish additional communications links via the open communications link within the predetermined time period without incurring delay due to the establishment of a communications link or the possibility that each voice channel of the base station is in service and, hence, unavailable.

For example, the user may desire either to phone the same party with whom user was previously communicating or to phone a third party. In addition, the user may wish to return the telephone calls of other persons who had attempted to contact the user, either prior to or during the terminated communications session, and had left a message for the user requesting that the user return their telephone call.

According to the present invention, the user may simply establish the additional communications via the open communications link or voice channel without significant delay and without competing with other cellular terminals for the limited number of voice channels. .In contrast, for a conventional cellular terminal to establish another communications link, another voice channel must be established between the cellular terminal and the cellular radio network. Due to the limited number of voice channels of a base station, each voice channel may already be in service such that there may be no available voice channel between the cellular radio network and the conventional cellular terminal. Accordingly, the user of the conventional cellular terminal would be forced to wait and to subsequently attempt to initiate the communications once a voice channel has become available, thus, delaying the establishment of a communications link. In addition, even if a voice channel is available between the conventional cellular terminal and the cellular radio network, the process of establishing the communications link via the voice channel consumes time and delays initiation of communications by the user of the conventional cellular terminal.

While the cellular radio communications system of the present invention is generally more expensive than a conventional cellular radio communications system, the maintenance of the communications link in an open state is generally a feature which may be selected by the many users of cellular terminals who desire continual or ready access to the cellular radio communications system. In addition, the length of the predetermined time period for which the communications link is open is also generally selected by the user with the cost of the feature proportional to the length of the time period.

The cellular radio communications system includes a cellular radio network for establishing communications, via a communications link such as a voice channel, with a cellular terminal and open communications link maintaining means for maintaining the communications link or voice channel open for the predetermined time period. The cellular radio communications system may also include means for initiating further communications with the cellular radio network via the open communications link or voice channel during the predetermined time period. Likewise, the cellular radio communications may include means for receiving further communications from the cellular radio network to the cellular terminal via the open communications link or voice channel during the predetermined time period.

In a first embodiment, the cellular radio communications system includes a first cellular terminal which communicates with the cellular radio network via a first voice channel and a second cellular terminal which communicates with a cellular radio network via a second voice channel. The cellular radio communications system further includes termination means, responsive to receipt of an end communications signal for the first cellular terminal, for disconnecting the first voice channel from the first cellular terminal such that the first voice channel can be reused. In contrast, the open voice channel maintaining means of this embodiment maintains the second voice open for a predetermined time period after receipt of an end communications signal for the second cellular terminal. Thus, the user of the second cellular terminal may continue to access cellular radio network during the predetermined time period via the second voice channel.

A cellular radio network according to the present invention may be either be analog or digital and preferably includes a plurality of radio base stations for communicating with a plurality of cellular terminals and a mobile switching center for interconnecting predetermined ones of the radio base stations and predetermined terminals. For analog cellular radio networks, the plurality of radio base stations and cellular terminals communicate via a voice channel. Alternatively, the plurality of radio base stations and cellular terminals of a digital cellular radio network communicate via both a voice channel and the digital control channel.

The cellular radio network of the cellular radio communications system may include a feature node for providing predetermined functions to cellular terminals with which communication is established by the cellular radio network. In the first embodiment of the present invention described above, the feature node may include both the termination means and the open voice maintaining means.

The cellular radio communications system of the present invention also preferably includes means for transmitting signals between the feature node and a cellular terminal. In particular, the feature node preferably includes means for bi-directionally communicating with the plurality of cellular terminals associated therewith. In an analog cellular radio communications system, the signals are transmitted via the open voice channel, while in a digital cellular radio communications system the signals are transmitted via the open digital control channel. These signals may include signals from the cellular terminal to revise the functions performed by the feature node or messages provided to the cellular terminal.

The cellular radio communications system may also be associated with a public switched telephone network which provides communications between the cellular radio network and a plurality of terminals associated with the public switched telephone network. In one embodiment, the feature node is associated with the public switched telephone network to provide predetermined functions to the terminals associated with both the public switched telephone network and the cellular radio network.

One embodiment of a cellular radio terminal according to the present invention includes communication means for transmitting signals to and receiving signals from a cellular radio network such that a channel may be established therebetween. The cellular terminal according to this embodiment also includes the open channel maintaining means for maintaining the channel therebetween in an open state for a predetermined time period following termination of communications between the cellular radio terminal and a second terminal. In this embodiment, the cellular radio terminal may include the means for initiating further communications via the open channel during the predetermined time period and means for receiving further communications via the open channel during the predetermined time period.

Accordingly, a communications link or voice channel between a cellular terminal and cellular radio network may be maintained in an open state following termination of communications with the cellular terminal. The communications link or voice channel is maintained open for a predetermined time period such that the cellular terminal may continue to access the cellular radio network without incurring the delay associated with initially establishing a voice channel between a cellular terminal and a cellular radio network. Further, the present invention permits the user of a cellular terminal to continue to access the cellular radio network via the open communications link during the predetermined time period without the possibility that each of the voice channels of the associated radio base station of the cellular radio network are already in service, such that the user would be forced to wait for an available voice channel.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in-the art. Like numbers refer to like elements throughout.

Figure 1:
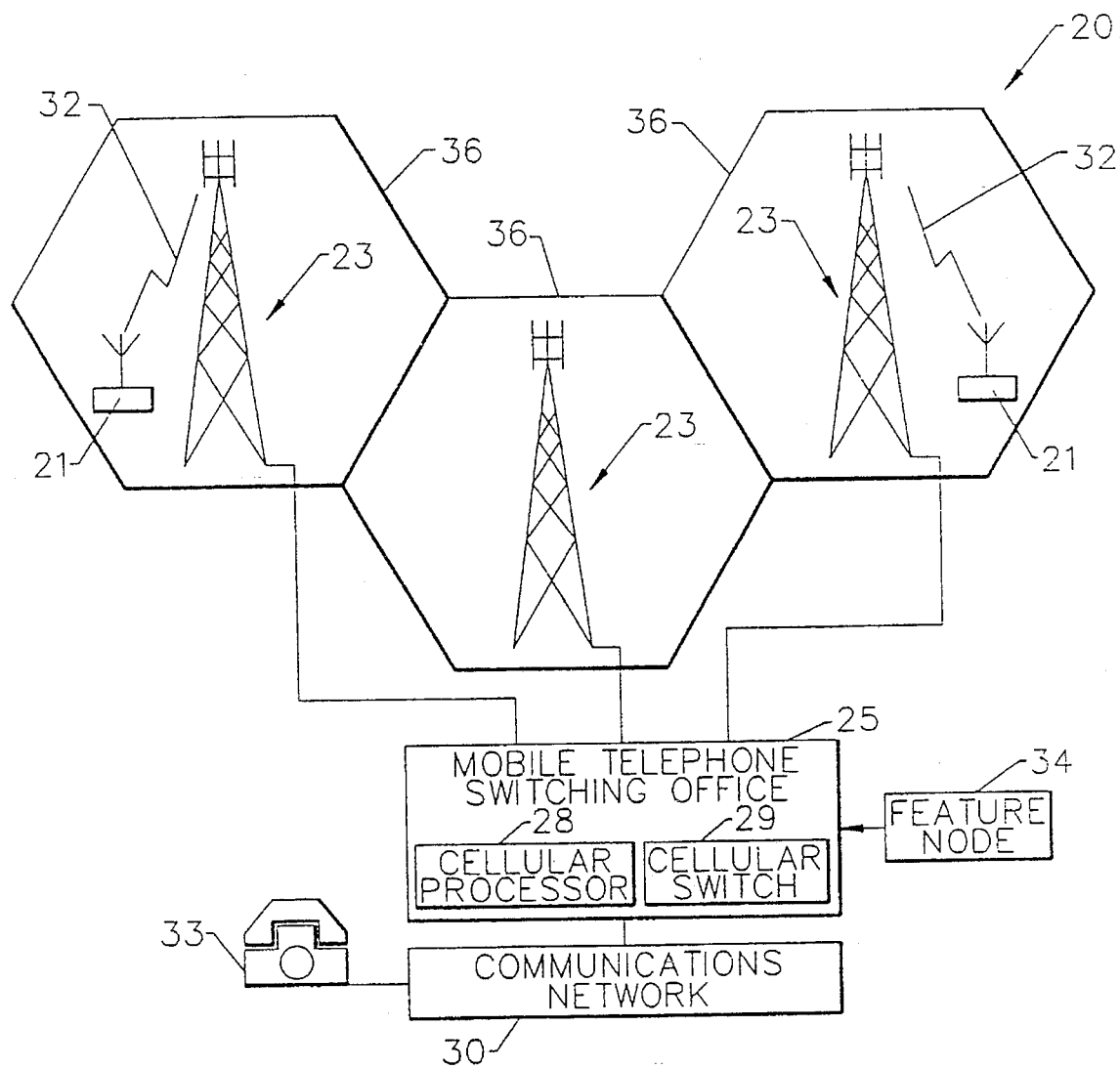
FIG. 1 is a schematic block diagram illustrating the basic components of a cellular radio communications system according to the present invention, including a feature node associated with a cellular radio network.

Referring now to FIG. 1, a cellular radio communications system 20 is illustrated. The cellular radio communications system 20 typically includes one or more mobile cellular terminals 21, one or more radio base stations 23 and a mobile telephone switching office 25. As known to those skilled in the art, the cellular terminals 21 may include cellular telephones, cellular facsimile machines, cellular paging devices and other types of cellular terminals.

The radio base stations 23 and the mobile telephone switching office 25 generally define the cellular radio network. The cellular radio network is divided into regions or cells 36. Each cell 36 includes a base station 23 which is adapted to communicate with the cellular terminals 21 in its cell 36.

As illustrated, the mobile telephone switching office 25 typically includes a cellular processor 28 and a cellular switch 29. The cellular switch 29 of the mobile telephone switching office 25 provides the interface to other associated communications networks 30, such as an associated public switched telephone network. The associated communications network 30 is, in turn, associated with and in communication with one or more terminals, such as the landline telephone terminal 33 illustrated in FIG. 1. Through the cellular radio communications network 20, a duplex radio communications link 32 may be effected between two cellular terminals 21, or between a cellular terminal 21 and a landline telephone terminal 33. The mobile telephone switching office 25 and, in particular, the cellular switch 29 may include the Home Location Register for storing data relating to the location and requested services of each subscriber of the cellular radio communications network 20.

The cellular radio communications system 20 of the present invention also includes open communications link maintaining means for maintaining the communications link in an open state between a cellular terminal 21 and the cellular radio network for a predetermined time period following termination of communications between the cellular terminal and another terminal, notwithstanding termination of communications therebetween. In particular, the communications link between a cellular terminal 21, the associated radio base station 23 and the mobile telephone switching office 25 is maintained in an open state for the predetermined time period.

Since the communications link is maintained in an open state between the cellular terminal 21 and the cellular radio network, the cellular terminal 21 may continue to access the cellular radio network within the predetermined time period via the open communications link. Thus, the user of the cellular terminal 21 may continue to access the cellular radio network without having to establish another communications link and incur the delay associated therewith or face the possibility of having each communications link of the respective base station 23 being already in service such that the user of the cellular terminal 21 has to wait for a communications link to become available.

Each cellular terminal 21 of a cellular radio communications network 20 need not include or be associated with an open communications link maintaining means feature since users of cellular terminals 21 which do include or are associated with the feature generally pay an additional fee for the feature. Instead, the cellular radio communication system 20 may be configured such that only predetermined ones of the cellular terminals 21 include or utilize the open communications link maintaining means. Thus, only those users who desire continual or ready access to the cellular radio network may select to utilize, and therefore pay for, the open communications link maintaining means feature. For the remainder of the cellular terminals 21, the cellular radio communications system 20 may include termination means for disconnecting the communications link established between those cellular terminals 21 and the cellular radio network following termination of communications with the cellular terminal 21 such that the communications link 32 can be reused.

For example, one embodiment of the cellular radio communications system 20 includes a first cellular terminal 21 which communicates with the cellular radio network via a first voice channel and a second cellular terminal 21 which communicates with a cellular radio network via a second voice channel. The cellular radio communications system 20 further includes termination means, responsive to receipt of an end communications signal for the first cellular terminal 21, for disconnecting the first voice channel from the first cellular terminal 21 such that the first voice channel can be reused. In contrast, the open voice channel maintaining means of this embodiment maintains the second voice open for a predetermined time period after receipt of an end communications signal for the second cellular terminal 21. Thus, the user of the second cellular terminal 21 may continue to access cellular radio network during the predetermined time period via the second voice channel.

As shown in FIG. 1, a feature node 34 may also be associated with the mobile telephone switching office 25 of the cellular radio communications system 20. Although the feature node 34 is illustrated as a discrete block in FIG. 1, all or a portion of the feature node 34 may actually be incorporated within the mobile telephone switching office 25 and, in particular, within the Home Location Register of the mobile telephone switching office The feature node 34 provides predetermined functions to the cellular terminals 21 with which communications is established by the cellular radio network. For example, the feature node 34 may establish an efficient communications link between terminals, such as via intermediate base stations, or provide voice-control speech information and number translation services as well as facilitating the establishment of conference telephone calls. Still further, a feature node 34 may provide paging services for the user of a cellular terminal 21 and may facilitate the establishment of alternative communications links if the primary communications link is unavailable.

Figure 2:
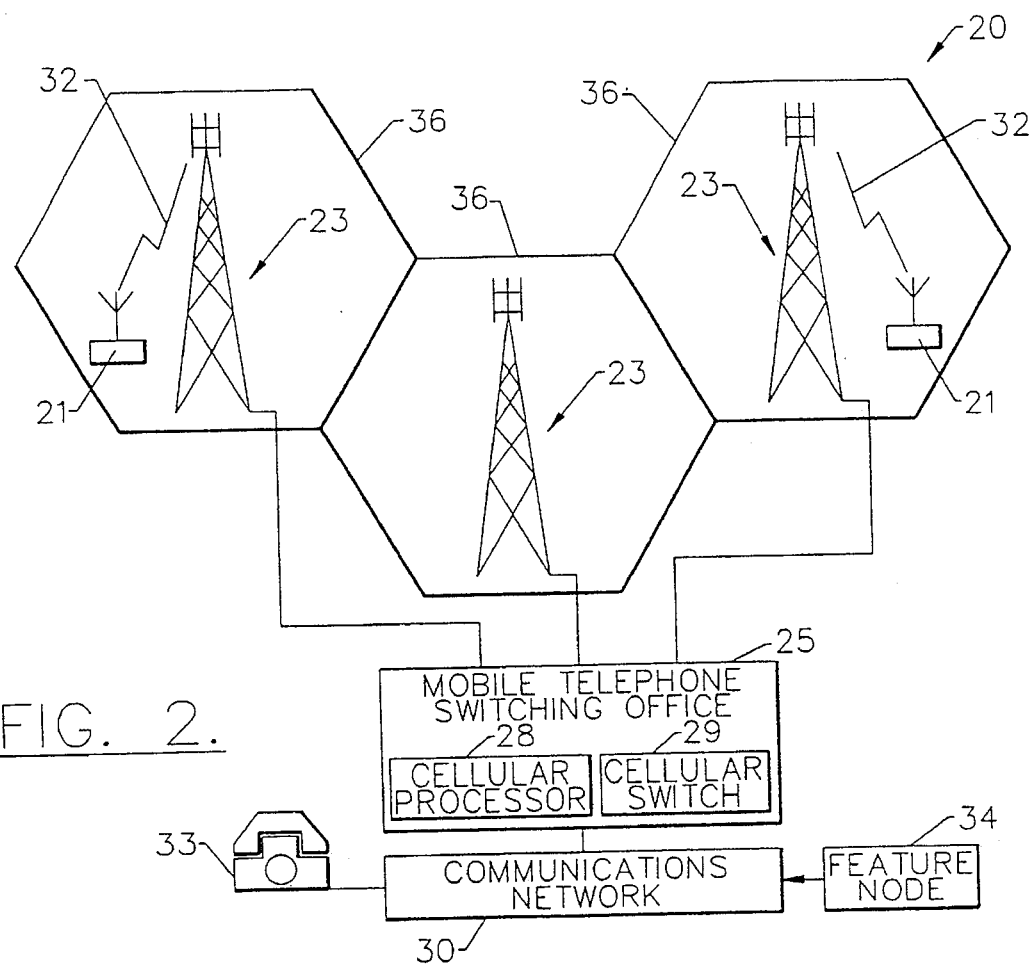
FIG. 2 is a schematic block diagram illustrating the basic components of a cellular communications system according to the present invention, including a feature node associated with a communications network, such as a public switched telephone network.

As illustrated in FIG. 2, the feature node 34 may instead be associated with another communications network 30, such as a public switched telephone network. Accordingly, the feature node 34 would provide predetermined functions to both the terminals associated with the communications network 30, such landline telephone terminals 33, and the cellular terminals 21 associated with the cellular radio network via the interface established between the mobile telephone switching office 25 and the associated communications network 30.

In addition, while the feature node 34 is illustrated as a single block in FIGS. 1 and 2 for purposes of illustration, the feature node 34 may be distributed within the cellular radio communications system 20 without departing from the spirit and scope of the invention. For example, a portion of the feature node 34 may be incorporated within the Home Location Register of the mobile telephone switching office 25 while the remainder of the feature node 34 may be external to, but associated with, the mobile telephone switching office 25.

The cellular radio communications system of the present invention may include either an analog or a digital cellular radio network. In an analog cellular radio network, the communications link 32 established between a cellular terminal 21 and a respective base station 23 is a voice channel on which voice, data and control signals are transmitted. In addition, the mobile telephone switching office 25 of an analog cellular radio network interconnects the respective radio base stations 23 and predetermined terminals, such as cellular terminals 21 or landline telephone terminals 33, via the voice channels to complete the communications link 32. Accordingly, voice, data and control signals may be transmitted via the voice channel between the cellular terminal 21, the radio base station 23, the mobile telephone switching office 25 and other terminals.

In a digital cellular radio network, the communications link 32 established between a cellular terminal 21 and a respective radio base station 23 includes both a voice channel and a digital control channel. Accordingly, voice and data signals are transmitted via the voice channel, while the control signals are transmitted via the digital control channel. Likewise, the communications link established between the radio base station 23 and the mobile telephone switching office 25 includes both voice channels and the digital control channel. The mobile telephone switching office 25 then establishes a communications link 32, such as via another radio base station 23, to another cellular terminal 21 within the cellular radio network or, via an associated communications network 30 to another terminal, such as a landline telephone terminal 33. This communications link 32 established by the mobile telephone switching office 25 typically includes a voice channel. In embodiments of the present invention in which the feature node 34 is associated with the mobile telephone switching office 25 as illustrated in FIG. 1, the interconnection between the mobile telephone switching office 25 of a digital cellular radio network and the feature note 34 generally includes the digital control channel. Thus, the appropriate control signals may be transmitted therebetween.

The communications link 32 which is generally maintained in an open state for the predetermined period of time following termination of communication is a voice channel. Thus, the open communications link maintaining means is generally an open voice channel maintaining means for maintaining a voice channel open between the cellular terminal 21 and the respective base station 23. Accordingly, a voice channel and an open voice channel maintaining means will be referred to hereinafter in conjunction with the present invention. However, the cellular radio communications system 20 of the present invention may include an open communications link maintaining means without departing from the spirit and scope of the present invention.

Figure 3A:
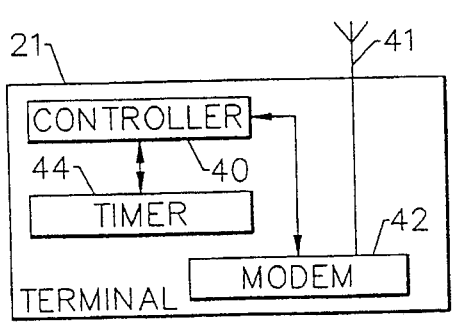
FIGS. 3A and 3B are schematic block diagrams of an analog and a digital cellular terminal, respectively, according to the present invention.
Figure 3B:
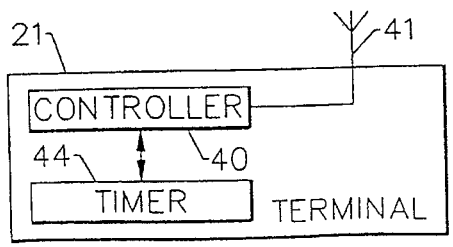

The open voice channel maintaining means may be included in the mobile telephone switching office 25 or, as illustrated in FIGS. 3 and 4, the cellular terminals 21 or a feature node 34 associated with a mobile telephone switching office 25, respectively. As illustrated in FIG. 3A, an analog cellular terminal 21 typically includes an antenna 41, a controller 40 and a modem 42 for transmitting and receiving signals via an established communications link 32 according to a predetermined format and rate. Likewise, as illustrated in FIG. 3B, a digital cellular terminal 21 typically includes an antenna 41 and a controller 40 which directly transmits and receives signals. The open voice channel maintaining means of cellular terminals 21, either analog or digital, which include such a feature preferably includes a timer 44 associated with the controller 40. In addition, the termination means of cellular terminals 21 which do not include open wire channel maintaining means preferably includes the controller 40.

Thus, upon termination of communications between the cellular terminal 21 and the cellular radio network, the timer 44 of a cellular terminal 21 which includes open voice channel maintaining means will measure the predetermined time period. For example, the timer 44 may initially be set to zero and may be incrementally increased following termination of communications by the cellular terminal 21 until the timer 44 reaches a predetermined value, at which time the cellular terminal 21 is disconnected from the voice channel such that the voice channel may be reused. Alternatively, the timer 44 may be initially set to a predetermined value and may be incrementally decreased until it reaches zero, at which time the cellular terminal 21 is disconnected from the voice channel. As known to those skilled in the art, other techniques of timing the predetermined time period may also be used without departing from the spirit and scope of the present invention.

Figure 4A:
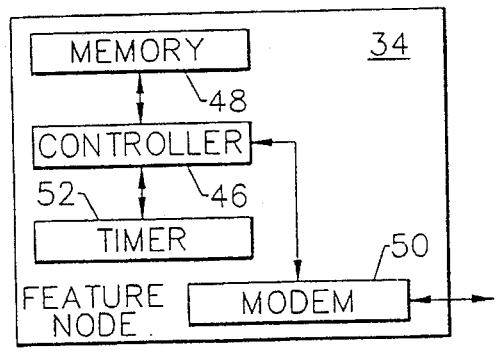
FIGS. 4A and 4B are schematic block diagrams of a feature node of an analog and a digital cellular radio communications system, respectively, according to the present invention.
Figure 4B:
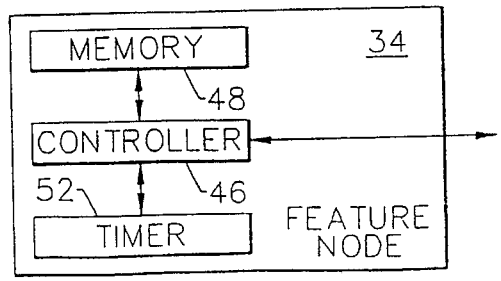

Alternatively, the feature node 34 may include the open voice channel maintaining means as illustrated schematically in FIGS. 4A and 4B. A typical analog implementation of a feature node 34 includes a controller 46 and associated memory 48 as well as a modem 50 for transmitting and receiving signals via a communications link 32. Likewise, a typical digital implementation of a feature node 34 includes a controller 46 for directly transmitting and receiving signals and an associated memory 48. While a single consolidated feature node 34 is illustrated in FIGS. 4A and 4B, the feature node 34 may be distributed throughout the cellular radio communications system 20. Thus, the feature node 34 may not require a dedicated controller 46, memory 48 and modem 50 (in analog applications), but may instead share such resources with other components of the cellular radio communications system 20.

A feature node 34, either analog or digital according to the present invention which includes the open voice channel maintaining means also includes a timer 52 associated with the controller 46. As described above in conjunction with a cellular terminal 21 incorporating the open voice channel maintaining means, the controller 46 and timer 52 of the feature node 34 compute the predetermined time period following the termination of communications by a cellular terminal 21 with the cellular radio network 20.

The length of the time period for which the communications link or voice channel is maintained in an open state may be established by the system operator during the initial implementation of the open voice channel maintaining means or, may be selected by the user of a particular cellular terminal 21. While the predetermined time period may be set to any desired value, typical time periods vary from 15 to 60 seconds, in which time period a user of a cellular terminal 21 may determine if additional communications are desired. Longer time periods are available, however, and some users may desire a dedicated voice channel such that the time period is effectively set to infinity and the voice channel is always maintained in an open state. Typically, the expense associated with the open voice channel maintaining means increases with the length of the time periods.

FIGS. 5A–5C and 6A–6C illustrate, in detail, one set of operations by which a cellular terminal 21 and the feature node 34, respectively, maintain a voice channel open for the predetermined time period. These operations may be performed by either analog or digital cellular terminals and feature nodes 34. As will be apparent to those skilled in the art, other sets of operations, including a reordering of the operations illustrated in FIGS. 5A–5C and 6A–6C may be implemented to maintain a voice channel open for a predetermined time period without departing from the spirit and scope of the present invention.

While the open voice channel maintaining means, including the timer, may be included within the mobile telephone switching office 25, a feature node 34 or the cellular terminals 21 themselves, the operations illustrated in FIGS. 5A–5C and 6A–6C may be simultaneously performed by both a cellular terminal and feature node 34, respectively, regardless of the location of the open voice channel maintaining means. Alternatively, as described hereinafter, either a cellular terminal 21 may perform the operations illustrated in FIGS. 5A–5C or the feature node 34 may perform the operations illustrated in FIGS. 6A–6C, with the cellular terminal 21 or feature node 34 which is performing the operations communicating, as indicated, with the other.

Figure 5A:
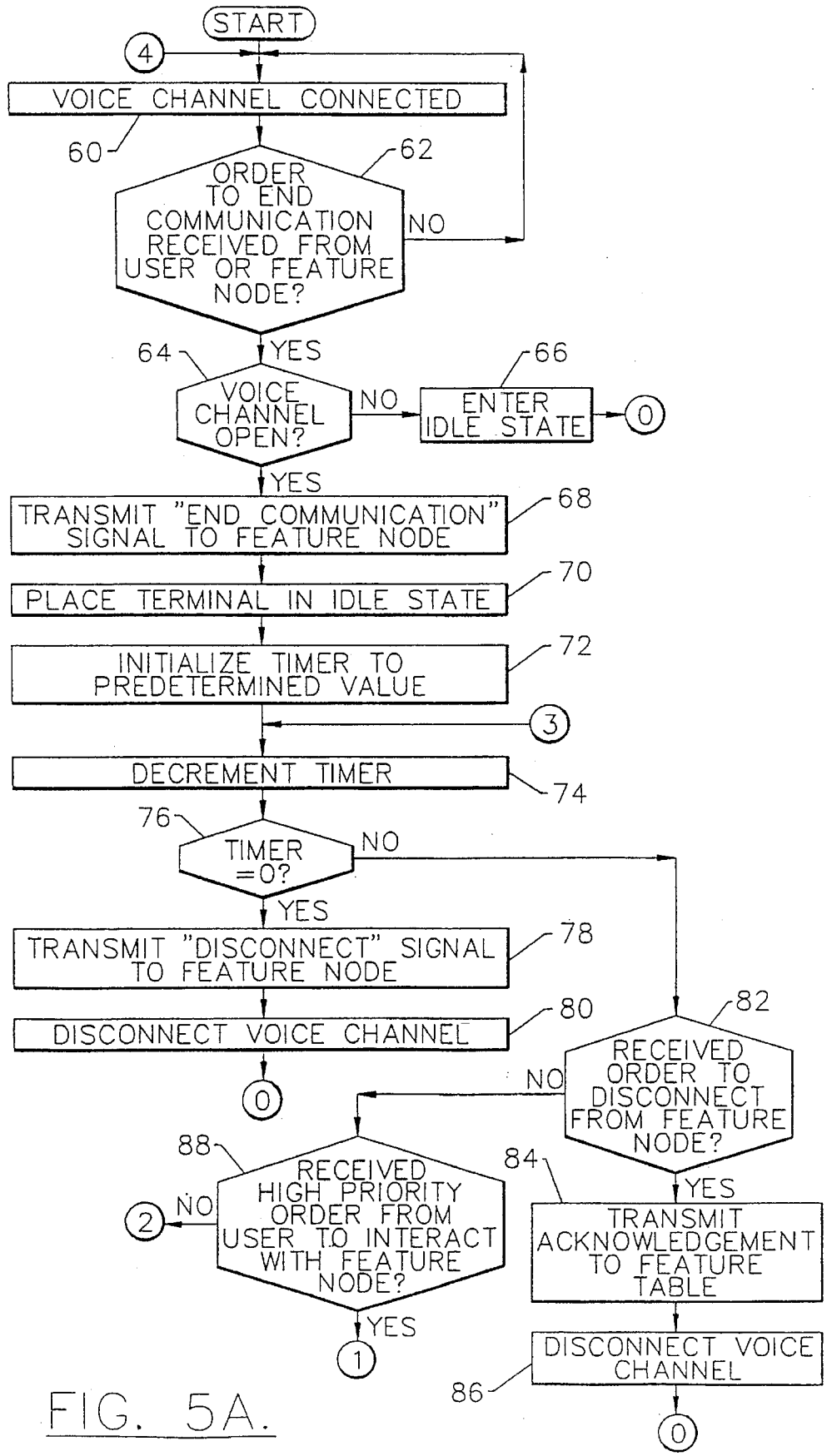
FIGS. 5A–5C are flow charts which illustrate maintaining an open voice channel by a cellular terminal according to the present invention.

As shown in block 60 of FIG. 5A for a cellular terminal 21 which is maintaining the voice channel open, the cellular terminal 21 is initially in use such that a communications link or voice channel is established between the cellular terminal 21 and the cellular radio network. The cellular terminal 21 and, in particular, the controller 40 of the cellular terminal 21 repeatedly monitors the signals transmitted via the voice channel in an analog cellular radio communication system 20 or via the digital control channel in a digital cellular radio communication system to determine if an "End Communications" signal has been received by the cellular terminal 21 from either the user of the cellular terminal 21 or from the feature node 34 as shown in block 62. Once the "End Communications" signal is detected, a cellular terminal 21 determines if the voice channel is still in an open state as shown in block 64.

If the voice channel has disconnected, albeit inadvertently or due to movement of the cellular terminal 21 out of the service area of the cellular radio communications system 20, the cellular terminal 21 enters an idle state as shown in block 66. In an idle state, the cellular terminal 21 does not communicate with other terminals.

Figure 5B:
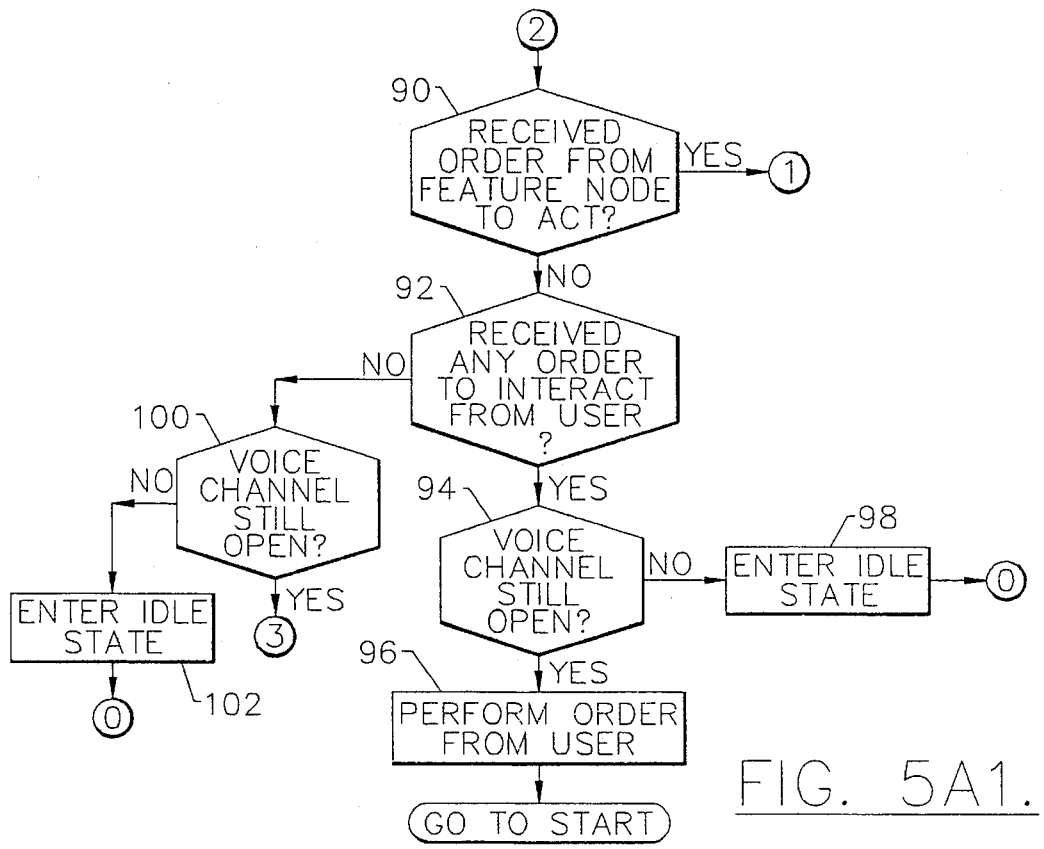
Figure 5B:
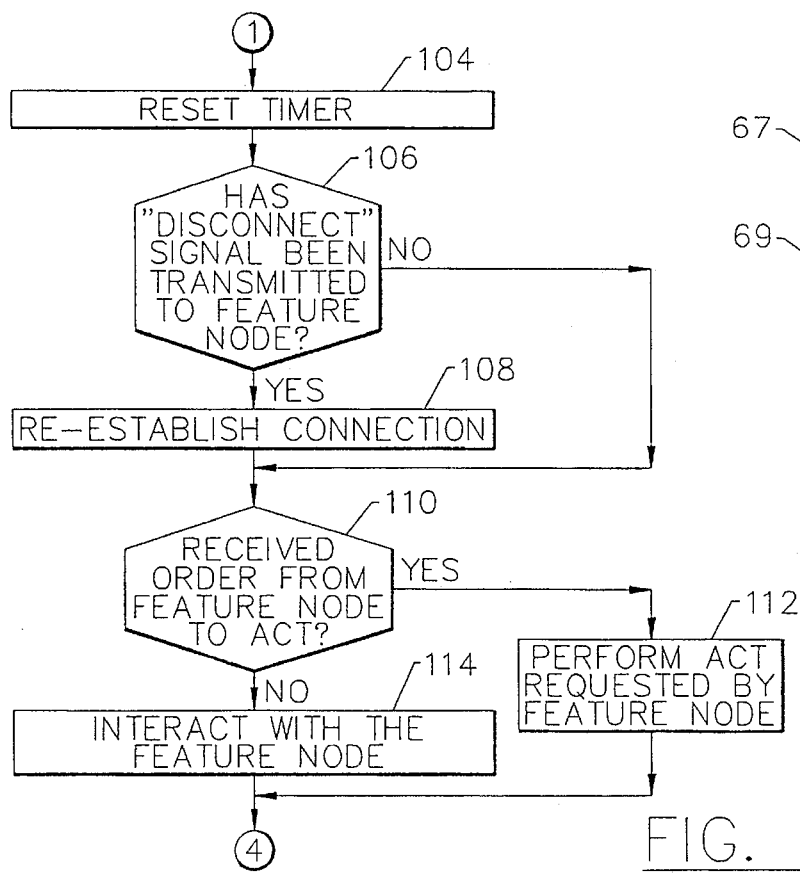
Figure 5C:
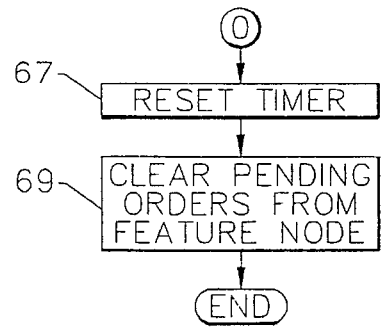

Subsequentially, the cellular terminal 21 performs the termination operations illustrated in FIG. 5C. In particular, the timer is reset and any pending orders from the feature node 34 are cleared as shown in blocks 67 and 69, respectively. Such pending orders, however, are typically stored or maintained in a queue, such as in memory 48, by the feature node 34. For cellular terminals 21 which include the open voice channel maintaining means, including a timer 44, the internal timer 44 is reset. Alternatively, if the feature node 34 includes the open voice channel maintaining means, including a timer 52, the cellular terminal 21 transmits a signal to the feature node 34 to reset the timer 52.

If, however, the voice channel is still open once the "End Communications" signal has been detected, the cellular terminal 21 transmits an "End Communications" signal to the feature node 34 as shown in block 68. Thereafter, the cellular terminal 21 is placed in an idle state and the timer is initialized to a predetermined value as shown in blocks 70 to respectively. Subsequentially, the timer is decremented and the value of the timer is compared to zero by the controller 40 as shown in blocks 74 and respectively. As explained above, the timer may be the timer 44 within the cellular terminal 21 or the timer 52 within the feature node 34, in which case the cellular terminal 21 transmits signals to the feature node 34 directing the timer 52 to be decremented and monitoring the current valve of the timer 52.

Once the timer equals zero and the predetermined time period is expired, the cellular terminal 21 transmits a "Disconnect" signal to the feature node 34 and disconnects the voice channel as shown in blocks 78 to 80, respectively. Thereafter, the cellular terminal 21 executes the termination operations illustrated in FIG. 5C and described above.

If the timer has not yet reached zero such that the predetermined time period has not yet expired, the cellular terminal 21 determines if it has received an order to disconnect from the feature node 34 as shown in block 82. For example, the feature node may have been notified by the operator of the cellular radio communication system 20 to disconnect the open voice channel or another cellular terminal, having a higher priority than the cellular terminal maintaining the voice channel in an open state, may have requested the voice channel such that the feature node 34 orders the cellular terminal 2i to disconnect therefrom.

If an order to disconnect has been received by the cellular terminal 21 from the feature node 34, the cellular terminal 21 will acknowledge receipt of the order to disconnect to the feature node 34 and will disconnect the voice channel as shown in blocks 84 and 86, respectively. Thereafter, the cellular terminal 21 will execute the termination operations illustrated in FIG. 5C.

If an order to disconnect has not been received from the feature node 34, the cellular terminal 21 will determine if it has received an order, having a relatively high priority, from the user to interact with the feature node 34 as shown in block 88. For example, the user of cellular terminal 21 may desire to place another telephone call, thus, ordering the cellular terminal 21 to interact with the feature node 34 to place the call. The relative priorities of orders is generally predetermined such that orders which involve interaction of the user with other terminals, such as the placing of a telephone call or a facsimile transmission, are assigned a relatively high priority. In contrast, orders by which the user communicates with the cellular radio network, such as redefining the functions performed by the feature node 34 or receiving or sending voice mail, are typically assigned lower priorities.

If the cellular terminal 21 has not received an order from the user to interact with the feature node 34, the cellular terminal 21 determines if it has received an order from the feature node 34 to act, such as to receive another telephone call., as illustrated block 90.

If the cellular terminal 21 has received an order from either the user to interact with the feature node 34 or from the feature node 34 to act, the cellular terminal 21 performs the reestablishment operations illustrated in FIG. 5B and described hereinafter. If the cellular terminal 21 has not received an order from the feature node 34 to act, the cellular terminal 21 determines if it has received any order to interact from the user as shown in block 92 of FIG. 5A1. These orders, such as orders to transfer data between the cellular terminal 21 and the feature node 34, are typically lower in priority and, as explained hereinafter, a voice channel will not be reestablished to perform these orders from the user if the voice channel has been disconnected, while the reestablishment operations illustrated in FIG. 5B is executed to reopen a voice channel, if necessary, for the higher priority orders.

If the cellular terminal detects that an order to interact has been received from the user, the cellular terminal 21 next determines if the voice channel is still open as shown in block 94 of FIG. 5A1. If the voice channel is still open, the cellular terminal performs the order requested by the user as shown at block 96 of FIG. 5A1 and, in doing so returns to block 60 of the flow chart illustrated in FIG. 5A in which a communications link 32 and, consequently, a voice channel is established by the cellular terminal 21. If, however, a voice channel is not open following receipt of an order to interact with the user, the cellular terminal 21 enters an idle state as shown in block 98 of FIG. 5A1 and begins the termination operations as illustrated in FIG. 5C.

If the cellular terminal 21 has not received any order to interact from the user, the cellular terminal 21 determines if the voice channel is still open as shown in block 100 of FIG. 5A1. If the voice channel is no longer open, the cellular terminal 21 enters an idle state as shown in block 102 of FIG. 5A1 and begins the termination operations illustrated in FIG. 5C. If the voice channel is still open, however, the cellular terminal 21 and, in particular, the controller 40 of the cellular terminal 21 decrements the timer and determines if the timer has reached zero such that the predetermined time period has expired as shown in blocks 74 and 76.

According to the reestablishment operations illustrated in FIG. 5B, the cellular terminal 21 initially resets the timer and determines if a "Disconnect" signal has been transmitted to the feature node 34 as shown in blocks 104 and 106, respectively. If a "Disconnect" signal has been transmitted to the feature node 34, the communications link 32 and, in particular, a voice channel is reestablished therebetween as shown in block 108. Thereafter, the cellular terminal 21 determines if an order to act has been received from the feature node 34 and, if so, performs the act requested by the feature node 34 as shown in blocks 110 and 112, respectively. If an order to act has not been received from the feature node 34, the cellular terminal 21 interacts with the feature node as ordered by the user in block 88. In either event, the cellular terminal 21 returns to block 60 of FIG. 5A in which a voice channel is connected and in use.

Figure 6A:
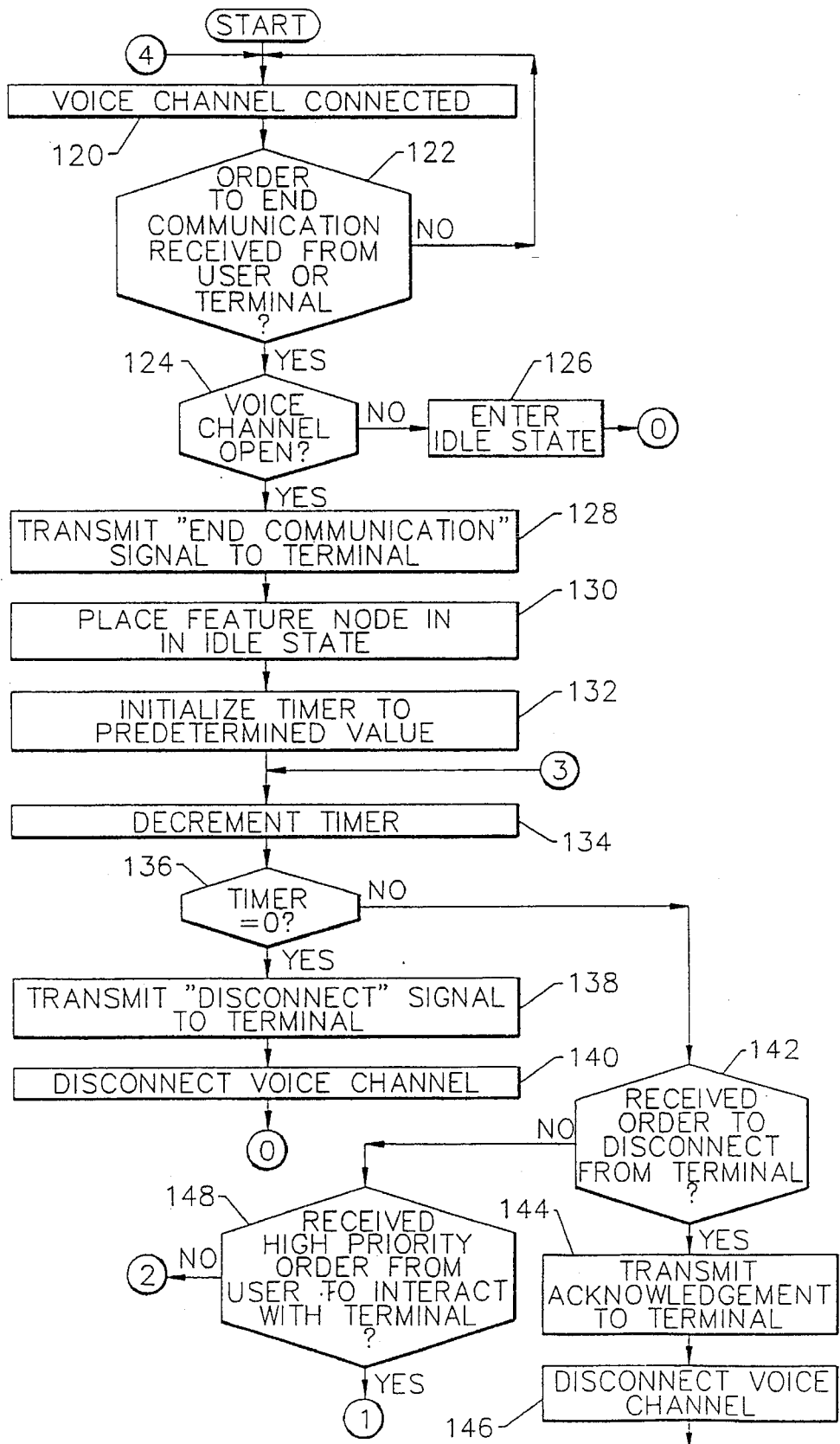
FIGS. 6A–6C are flow charts which illustrate maintaining an open voice channel by a feature node according to the present invention.
Figure 6B:
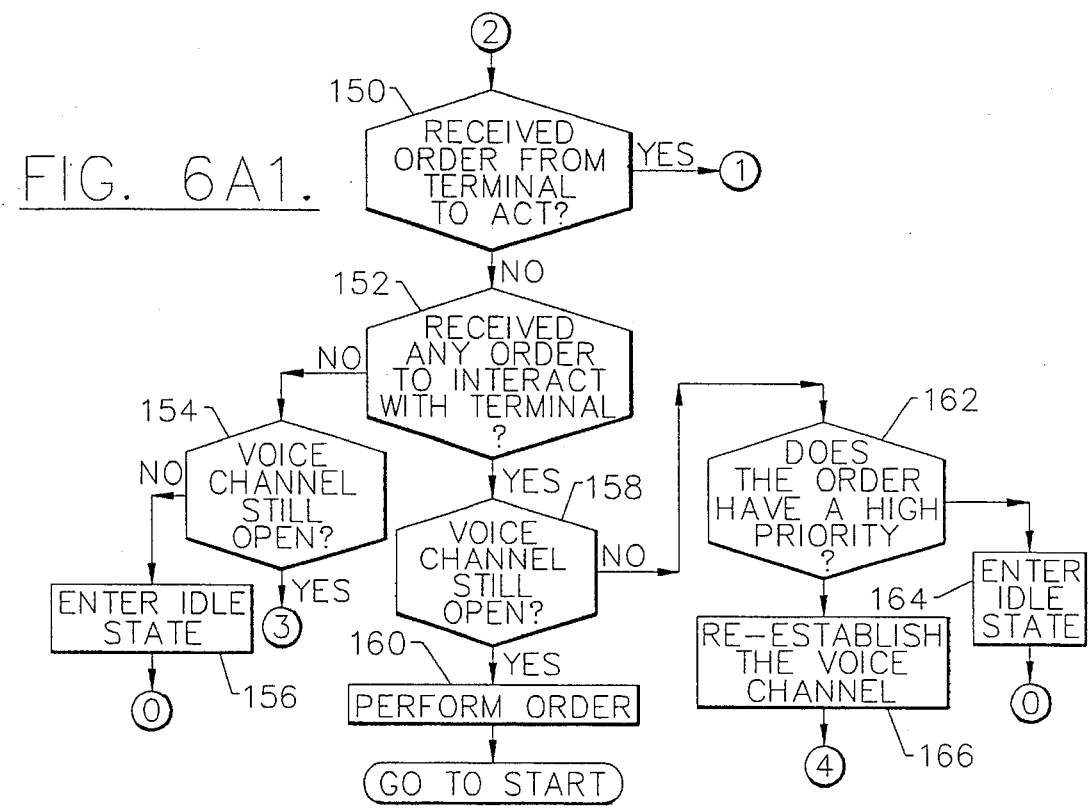
Figure 6B:
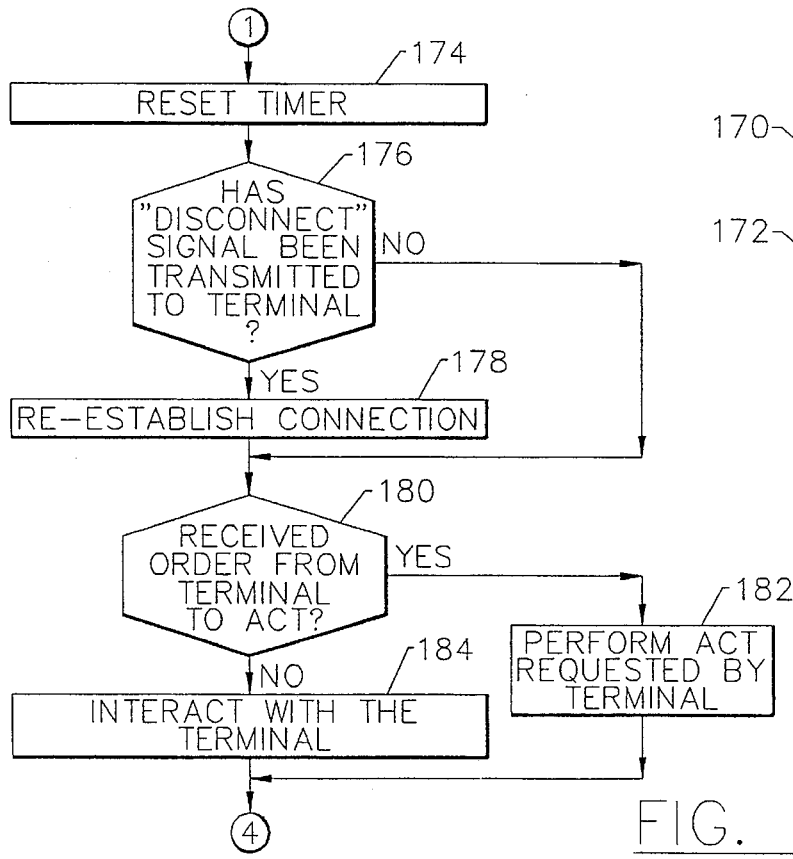
Figure 6C:
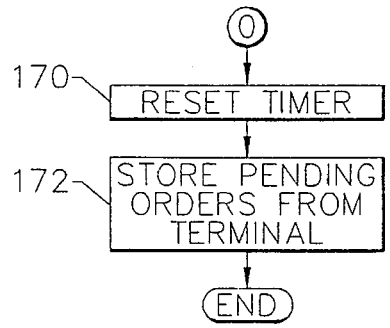

As previously explained, FIGS. 6A–6C illustrate operations which may be performed by a feature node 34 in maintaining an open voice channel. In particular, the voice channel is initially connected and in use between a cellular terminal 21 and the cellular radio network with which the feature node 34 is associated, as shown in block 120. The feature node 34 continually monitors all incoming signals to determine if an "End Communications" signal has been received from the cellular terminal 21 and, if so, determines if the voice channel is open, as illustrated in blocks 122 and 124, respectively.

If the voice channel is no longer open, the feature node 34 enters an idle state as shown in block 126 and begins the termination operations illustrated in FIG. 6C in which the timer is reset and pending orders from the cellular terminal 21 are stored, such as in a queue in memory 48, as illustrated in blocks 170 and 172, respectively. If the voice channel is open, the feature node 34 transmits an "End Communication" signal to the cellular terminal enters an idle state and initializes the timer to a predetermined value as shown in blocks 128–132. For feature nodes 34 which include the open voice channel maintaining means, including a timer 52, the internal timer 52 is reset. Alternatively, if the cellular terminals 21 include the open voice channel maintaining means, including a timer 44, the feature node 34 transmits a signal to the cellular terminal 21 to reset the timer 44.

Thereafter, the timer is decremented and is monitored by the feature node 34 to determine if the timer has reached zero, such that the predetermined time period has been expired, as shown in blocks 134 and 136, respectively. As explained above, the timer may be the timer 52 within the feature node 34 or the timer 44 within the cellular terminal 21, in which case the feature node 34 transmits signals to the respective cellular terminal 21 directing the timer 44 to be decremented and monitoring the current valve of the timer 44.

If the predetermined time period has expired, the feature node 34 transmits a "Disconnect" signal to the cellular terminal 21 and disconnects the voice channel as shown in blocks 138 and 140, respectively, prior to executing the termination operations as illustrated in FIG. 6C.

If the predetermined time period has not yet expired, the feature node 34 determines if it has received an order to disconnect from the cellular terminal 21 as shown in block 142. If the feature node 34 has received an order to disconnect from the cellular terminal 21, such as an order from the cellular terminal 21 as shown in block 78 of FIG. 5A, the feature node 34 transmits an acknowledgement to the cellular terminal 21 and disconnects the voice channel as shown in blocks 144 and 146, respectively, prior to executing the termination operations as shown in FIG. 6C.

If the feature node 34 has not received an order to disconnect from the cellular terminal 21, the feature node 34 determines if it received either an order from the user to interact with the cellular terminal 21, such as an order to exchange information with the cellular terminal 21, or an order from the cellular terminal 21 to act, such as to place an additional telephone call, as shown in blocks 148 and 150 of FIG. 6A1, respectively. If the feature node 34 has received either an order from the cellular terminal 21 to act or an order from the user to interact with the cellular terminal 21, the feature node 34 enters the reestablishment operations illustrated in FIG. 6B and described hereinbelow.

If the feature node 34 has received neither order, the feature node 34 determines if it has received any order to interact with the cellular terminal 21 as shown in block 152 of FIG. 6A1. This order to interact may be from, among others, the cellular terminal 21, the mobile telephone switching office or another feature node and may, for example, request the feature node 34 to check the status of the cellular terminal 21. If the feature node 34 has not received any order to interact with the cellular terminal the feature node 34 determines if the voice channel is still open as shown at block 154 of FIG. 6A1 and, if so, again decrements the timer and determines if the timer has reached zero as illustrated in blocks 134 and 136. If the voice channel is no longer open, the feature node 34 enters an idle state as shown at block 156 of FIG. 6A1 and begins the termination operations illustrated in FIG. 6C.

If the feature node 34 has received an order to interact with the cellular terminal 21, the feature node 34 determines if the voice channel is still open as shown in block 158 of FIG. 6A1 and, if so, performs the order as shown as block 160 of FIG. 6A1. In performing the order, the feature node 34 returns to block 120 wherein the voice channel is connected and in use.

If the voice channel is no longer open, the feature node 34 determines if the order has a high priority in comparison with a predetermined priority value as shown in block 162 of FIG. 6A1. For example, a typical order having a relatively high priority is an order to place an additional telephone call while an order to transfer data between the feature node 34 and the cellular terminal 21 has a relatively low priority. If the order does have a high priority, the voice channel is reestablished as shown in block 166 of FIG. 6A1 and the feature node 34 performs the reestablishment operations illustrated in FIG. 6B. If the order does not have a high priority, the feature node 34 enters an idle state, as shown in block 164 of FIG. 6A1, and begins the termination operations as illustrated in FIG. 6C.

As illustrated in FIG. 6C, the termination operations involve not only resetting the timer, but also storing the pending, low priority order such that it may be subsequently performed, as shown in blocks 170 and 172. In particular, the pending low priority orders are subsequentially performed when a communications link 32 or a voice channel has already been established for another purpose, such as to support a subsequent telephone call.

The reestablishment operations are illustrated in FIG. 6B in which the feature node 34 reestablishes connection with the voice channel. In particular, the feature node 34 initially resets the timer and determines if the "Disconnect" signal has been transmitted to the cellular terminal 21 as shown in blocks 174 and 176, respectively. If a "Disconnect" signal has been transmitted to the cellular terminal 21, the connection and, in particular, the voice channel is reestablished as shown in block 178. Regardless of whether a "Disconnect" signal has been transmitted to the cellular terminal 21, the feature node 34 determines if it has received an order from the cellular terminal 21 to act as shown in block 180. If so, the feature node 34 performs the act requested by the cellular terminal 21 and, if not, the feature node 34 interacts with the cellular terminal 21 as shown in blocks 182 and 184, respectively. In performing either operation, however, the feature node 34 returns to block 120 of FIG. 6A in which the voice channel is connected and in use.

According to the present invention, the user of a cellular terminal 21 may reestablish connection via the open voice channel during the predetermined time period to perform a plurality of tasks. For example, a message may be transmitted to the cellular terminal 21 by the feature node 34 via the cellular radio communications system 20. The transmittal of the message to the cellular terminal 21 initiates a predetermined time period in which the communications link 32 and, in particular, the voice channel over which the message was transmitted is maintained in an open state. Thus, if the user of the cellular terminal 21 desires to place a telephone call, in response to the message, either to another user or to a voice mailbox, the user may establish a communications link 32 via the open voice channel without significant delay.

Alteratively, a user of cellular terminal 21 may receive a new telephone call via the open voice channel within the predetermined period following the termination of a prior communication. In addition, the user of a cellular terminal 21 may reconfigure or redefine the functions to be formed by a feature node 34 by transmitting signals via the open voice channel in an analog cellular radio network or via the digital control channel in a digital cellular radio network within the predetermined time period following termination of the prior communications.

Still further, the prior communications of the user of a cellular telephone 21, may spur or cause the user to initiate further communications. For example, the user may wish to transmit a facsimile or electronic-mail or place an additional telephone call following termination of the initial communications. These additional communications may be performed via the open communications link 32 or voice channel within the predetermined time period without having to establish an new communications link and incurring the resulting delays or facing the possibility of all of the communications links or voice channels being in service and, hence, unavailable.

In the drawings and the specification, there has been set forth a preferred embodiment of the invention and, although specific tells are employed, the terms are used in a generic and descriptive sense only and not for purpose of limitation, the scope of the invention being set forth in the following claims.

What which is claimed is:

1. A cellular radio communications system comprising:

a cellular radio network;

a first cellular terminal which communicates with said cellular radio network via a first voice channel;

a second cellular terminal which communicates with said cellular radio network via a second voice channel;

termination means, responsive to receipt of an end communications signal for said first cellular terminal which indicates that communications between the first cellular terminal and the cellular network have been terminated, for disconnecting the first voice channel from said first cellular terminal such that the first voice channel can be reused; and open voice channel maintaining means, responsive to receipt of an end communications signal for said second cellular terminal which indicates that the communications between the second cellular terminal and the cellular network have been terminated, for maintaining the second voice channel open for a predetermined time period after receipt of the end communications signal for said second cellular terminal, such that the second cellular terminal continues to access said cellular radio network during the predetermined time period thereafter, via the second voice channel, thereby allowing the second cellular terminal to initiate and receive new communications to and from said cellular telephone network without requiring a new access to the cellular network.

2. The cellular radio communications system according to claim 1 further comprising means for initiating further communications with said cellular radio network by said second cellular terminal via the open second voice channel during the predetermined time period.

3. The cellular radio communications system according to claim I further comprising means for receiving further communications from said cellular radio network to said second cellular terminal via the open second voice channel during the predetermined time period.

4. The cellular radio communications system according to claim 1 wherein said cellular radio network comprises a feature node for providing predetermined functions to cellular terminals with which communication is established by said cellular radio network.

5. The cellular radio communications system according to claim 4 wherein said feature node includes said termination means and said open voice channel maintaining means.

6. The cellular radio communications system according to claim 4 wherein said cellular radio network is an analog cellular radio network comprising:

a plurality of radio base stations for communicating, via voice channels, with a plurality of cellular terminals; and a mobile switching center for interconnecting, via voice channels, predetermined ones of said radio base stations and predetermined terminals.

7. The cellular radio communications system according to claim 6 wherein said analog cellular radio communications system further comprises means for transmitting signals, via the open second voice channel during the predetermined time period, between said feature node and the second cellular terminal.

8. The cellular radio communications system according to claim 7 wherein said transmitting means comprises means for transmitting signals, via the open second voice channel, from the cellular terminal to said feature node to revise the functions performed by said feature node.

9. The cellular radio communications system according to claim 7 wherein said transmitting means comprises means for transmitting a message, via the open second voice channel, to said second cellular terminal after receipt of the end communications signal for said second cellular terminal.

10. The cellular radio communications system according to claim 4 wherein said cellular radio network is a digital cellular radio network comprising:
   a plurality of radio base stations for communicating, via both voice channels and digital control channels, with a plurality of cellular terminals; and
   a mobile switching center for interconnecting predetermined ones of said radio base stations and predetermined terminals.

11. The cellular radio communications system according to claim 10 wherein said open voice channel monitoring means also maintains the digital control channel in an open state between said second cellular terminal and said digital cellular radio network for the predetermined time period after receipt of the end communications signal for said second cellular terminal, and wherein the cellular radio communications system further comprises means for transmitting signals, via the open digital control channel during the predetermined time period, between said feature node and said second cellular terminal.

12. The cellular radio communications system according to claim 11 wherein said transmitting means comprises means for transmitting signals, via the open digital control channel, from said second cellular terminal to said feature node to revise the functions performed by said feature node.

13. The cellular radio communications system according to claim 11 wherein said transmitting means comprises means for transmitting a message, via the open digital control channel, to said second cellular terminal after receipt of the end communications signal for said second cellular terminal.

14. The cellular radio communications system according to claim 1 further comprising a public switched telephone network which provides communications between said cellular radio network and a plurality of terminals associated with said public switched telephone network.

15. The cellular radio communications system according to claim 14 wherein said public switched telephone network comprises a feature node for providing predetermined functions to the terminals associated with both said public switched telephone network and said cellular radio network, and wherein said feature node includes said termination means and said open voice maintaining means.

16. A cellular radio communications system comprising:
   a cellular radio network for establishing communications link between a cellular terminal associated with said cellular radio network and a second terminal; and
   open communications link maintaining means for maintaining the communications link in an open state between the cellular terminal and said cellular radio network for a predetermined time period following termination of communications between the cellular terminal and the second terminal such that the cellular terminal continues to access said cellular radio network within the predetermined time period via the open communications link thereby allowing the cellular terminal to initiate and receive new communications to and from said cellular telephone network without requiring a new access to the cellular radio network, notwithstanding termination of communications between the cellular terminal and the second terminal.

17. The cellular radio communications system according to claim 16 further comprising means for initiating further communications by the cellular terminal, via the open communications link during the predetermined time period.

18. The cellular radio communications system according to claim 16 further comprising means for receiving further communications to the cellular terminal, via the open communications link during the predetermined time period.

19. The cellular radio communications system according to claim 16 further comprising a feature node, associated with said cellular radio network, for providing predetermined functions to the cellular terminals with which communication is established by said cellular radio network, and wherein said feature node includes open communications link maintaining means.

20. The cellular radio communications system according to claim 19 wherein said cellular radio network comprises:
   a plurality of radio base stations for communicating, via communications links, with a plurality of cellular terminals; and
   a mobile switching center for establishing communications links between predetermined ones of said radio base stations and predetermined terminals.

21. The cellular radio communications system according to claim 20 wherein said cellular radio network further comprises means for transmitting signals, via the open communications link during the predetermined time period, between said feature node and the cellular terminal.

22. The cellular radio communications system according to claim 21 wherein said transmitting means comprises means for transmitting signals, via the open communications link, from the cellular terminal to said feature node to revise the functions performed by said feature node.

23. The cellular radio communications system according to claim 21 wherein said transmitting means comprises means for transmitting a message, via the open communications link, to the cellular terminal following termination of communications between the cellular terminal and the second terminal.

24. A feature node for providing predetermined functions to a plurality of cellular terminals, wherein the cellular terminals are in communication, via an associated voice channel, with a cellular radio communications network, the feature node comprising:
   means for bidirectionally communicating with the plurality of cellular terminals via the cellular radio communications network; and
   open voice channel maintaining means for maintaining the associated voice channel between a cellular terminal and the cellular radio communications network in an open state for a predetermined time period following termination of communications by the cellular terminal with the cellular radio communication network, such that the cellular terminal continues to access the cellular radio communications network within the predetermined time period via the open voice channel thereby allowing the cellular terminal to initiate and receive new communications to and from said cellular telephone network without requiring a new access to the cellular network, notwithstanding termination of communications between the cellular terminal and the cellular radio communications network.

25. The feature node according to claim 24 wherein the cellular radio communications network is an analog cellular radio communications network, and wherein said bidirectional communicating means comprises:

means for transmitting a message, via the open voice channel during the predetermined time period, from the feature node to a cellular terminal following termination of communications by the cellular terminal with the analog cellular radio communications network; and means for receiving signals, via the open voice channel, from the cellular terminal wherein the received signals are indicative of the functions to be performed by the feature node.

26. The feature node according to claim 24 wherein the cellular radio communications network is a digital cellular radio communications network such that the feature node and the plurality of cellular terminals are interconnected by both the voice channel and a digital control channel, and wherein said open voice channel maintaining means also maintains the digital control channel in an open state between the cellular terminals and the digital cellular radio communications network for the predetermined time period following termination of communications by the cellular terminal with the digital cellular radio communications network.

27. The feature node according to claim 26 wherein said bidirectional communicating means comprises:

means for transmitting a message, via the open digital control channel, to a cellular terminal following the termination of communications by the cellular terminal with the digital cellular radio communications network; and means for receiving signals, via the open digital control channel, from the cellular terminal wherein the received signals are indicative of the function to be performed by the feature node.

28. A cellular radio terminal comprising:

communication means for transmitting signals to and receiving signals from a cellular radio communications network such that a channel may be established between the cellular radio terminal and a second terminal; and open channel maintaining means for maintaining the channel in an open state between the cellular radio terminal and the cellular radio communications network for a predetermined time period following the termination of communications between the cellular radio terminal and the second terminal such that the cellular radio terminal continues to access the cellular radio communications network within the predetermined time period via the open channel thereby allowing the cellular terminal to initiate and receive new communications to and from said cellular telephone network without requiring a new access to the cellular network, notwithstanding termination of communications between the cellular terminal and the cellular radio communications network.

29. The cellular radio terminal according to claim 28 wherein said communication means further comprises means for initiating further communications by the cellular radio terminal, via the open channel during the predetermined time period.

30. The cellular radio terminal according to claim 28 wherein said communication means further comprises means for receiving further communications, via the open channel during the predetermined time period.

31. A method of maintaining an open voice channel between a cellular terminal and an associated cellular radio communications network, the method comprising the steps of:

detecting the termination of communications, via a voice channel, between the cellular terminal and another terminal; and maintaining the voice channel, which supported the terminated communications, open between the cellular terminal and the associated cellular radio communications network for a predetermined time period following the detected termination of communications such that the cellular terminal continues to access the cellular radio communications network within the predetermined time period via the open voice channel thereby allowing the cellular terminal to initiate and receive new communications to and from said cellular telephone network without requiring a new access to the cellular network, notwithstanding termination of communications between the cellular terminal and the cellular radio communications network.

32. The method of maintaining an open voice channel according to claim 31 further comprising the step of initiating further communications by the cellular terminal during the predetermined time period via the open voice channel.

33. The method of maintaining an open voice channel according to claim 31 further comprising the step of receiving further communications to the cellular terminal during the predetermined time period via the open voice channel.

34. The method of maintaining an open voice channel according to claim 31 further comprising the step of placing the cellular terminal in an idle state during the predetermined time period wherein the cellular terminal does not communicate with other terminals.

35. The method of maintaining an open voice channel according to claim 31 further comprising the step of terminating the idle state of the cellular terminal upon receipt of a signal from the cellular radio communications network or activation of the cellular terminal by an operator.

36. The method of maintaining an open voice channel according to claim 34 further comprising the step of disconnecting the open voice channel between the cellular terminal and the associated cellular radio communications network upon the expiration of the predetermined time period.

37. The method of maintaining an open voice channel according to claim 31 wherein the associated cellular radio communications network is a digital cellular radio communications network, and wherein the maintaining step further comprises the step of maintaining a digital control channel in an open state between the cellular terminal and the associated digital cellular radio communications network for the predetermined time period following the detected termination of communications.

38. The method of maintaining an open voice channel according to claim 37 wherein the associated cellular radio communications network includes a feature node for providing predetermined functions to the cellular terminal associated with the cellular radio communications network, and wherein the method of maintaining an open voice channel further comprises the step of transmitting signals, via the open digital control channel during the predetermined time period, between the feature node and the cellular terminal.

39. The method of maintaining an open voice channel according to claim 38 wherein said transmitting step further comprises the step of transmitting signals, via the open digital control channel, from the cellular terminal to the feature node to revise the functions performed by the feature node.

40. The method of maintaining an open voice channel according to claim 38 wherein said transmitting step further comprises the step of transmitting a message, via the open digital control channel, to the cellular terminal following the detected termination of communications between the cellular terminal and another terminal.

41. The method of maintaining an open voice channel according to claim 31 wherein the associated cellular radio communications network is an analog cellular radio communications network which includes a feature node for providing predetermined functions to the cellular terminal associated with the cellular radio communications network, and wherein the method of maintaining an open voice channel further comprises the step of transmitting signals, via the open voice channel during the predetermined time period, between the feature node and the cellular terminal.

42. The method of maintaining an open voice channel according to claim 41 wherein said transmitting step further comprises the step of transmitting signals, via the open voice channel, from the cellular terminal to the feature node to revise the functions performed by the feature node.

43. The method of maintaining an open voice channel according to claim 41 wherein said transmitting step further comprises the step of transmitting a message, via the open voice channel, to the cellular terminal following the detected termination of communications between the cellular terminal and another terminal.

44. A method of maintaining an open voice channel between a cellular terminal and an associated cellular radio communications network, the method comprising the steps of:

detecting the termination of communications, via a first voice channel, between a first cellular terminal and the cellular radio communications network, and, via a second voice channel, between a second cellular terminal and the cellular radio communications network;

disconnecting the first voice channel from the first cellular terminal once the termination of communications has been detected such that the first voice channel can be reused; and maintaining the second voice channel open between the second cellular terminal and the cellular radio communications network for a predetermined time period following the detected termination of communications such that the second cellular terminal continues to access the cellular radio communications network during the predetermined time period via the open voice channel thereby allowing the cellular terminal to initiate and receive new communications to and from said cellular telephone network without requiring a new access to the cellular network, notwithstanding termination of communications between the second cellular terminal and the cellular radio communications network.

45. The method of maintaining an open voice channel according to claim 44 further comprising the step of initiating further communications by the second cellular terminal during the predetermined time period via the open second voice channel.

46. The method of maintaining an open voice channel according to claim 44 further comprising the step of receiving further communications to the second cellular terminal during the predetermined time period via the open second voice channel.

47. The method of maintaining an open voice channel according to claim 44 further comprising the step of disconnecting the open second voice channel between the second cellular terminal and the associated cellular radio communications network upon the expiration of the predetermined time period.

\* \* \* \* \*